United States Patent
Dybro et al.

[11] Patent Number: 5,853,135
[45] Date of Patent: Dec. 29, 1998

[54] CHAIN LINK RACK PRETENSIONER

[75] Inventors: Niels Dybro, Clinton Township; Roseanna Zia, Troy; H. John Miller, III, Macomb Township; Jason Raines, Harrison Township, all of Mich.

[73] Assignee: AlliedSignal Inc., Morristown, N.J.

[21] Appl. No.: 803,969

[22] Filed: Feb. 21, 1997

[51] Int. Cl.⁶ .................................................. B60R 22/46
[52] U.S. Cl. ............................................................ 242/374
[58] Field of Search ........................... 242/374; 297/478, 297/480; 280/806

[56] References Cited

U.S. PATENT DOCUMENTS

| | | | |
|---|---|---|---|
| 4,444,010 | 4/1984 | Bendler | 242/374 |
| 4,508,287 | 4/1985 | Nilsson | 242/374 |
| 5,443,222 | 8/1995 | Modinger et al. | 242/374 |
| 5,697,571 | 12/1997 | Dybro et al. | 242/374 |

*Primary Examiner*—John M. Jillions
*Attorney, Agent, or Firm*—Markell Seitzman

[57] ABSTRACT

An apparatus (20, 100) comprising: a driven gear (102) operatively linked to a spool of a retractor (20) to rotate the spool (24) in a direction of retraction to cause a seat belt (31) wound thereabout to retract; an arcuate tube (108) having a flat exit end (302) proximate the gear; a flexible chain (130), moveable within the tube, having a front end (134a) initially maintained out of engagement with the first gear and pushed into engagement with the first gear to cause same to rotate; a piston (600) for pushing the chain (130) into engagement with the gear thereby causing the gear to rotate and catching mechanism for retaining the chain after it has exited the exit end of the tube.

17 Claims, 7 Drawing Sheets

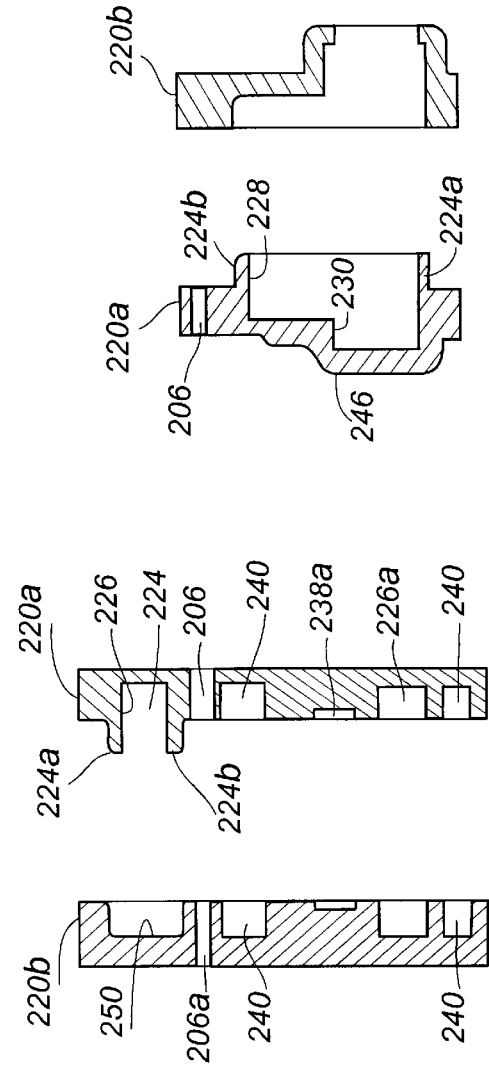
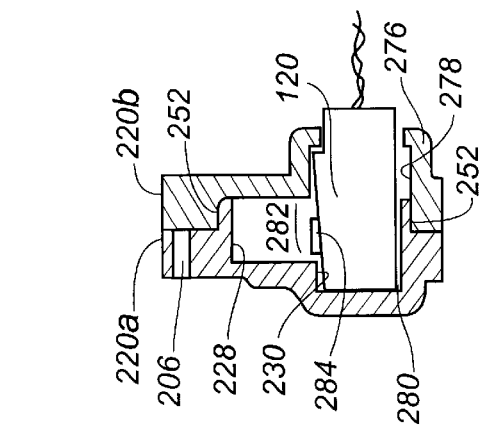
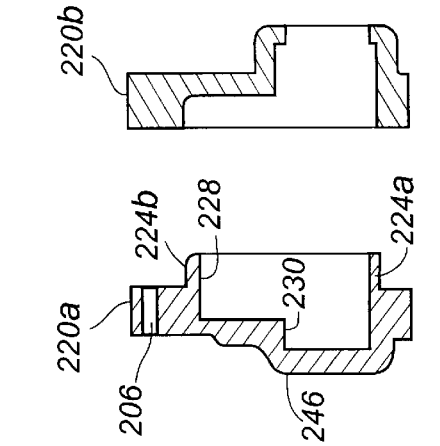
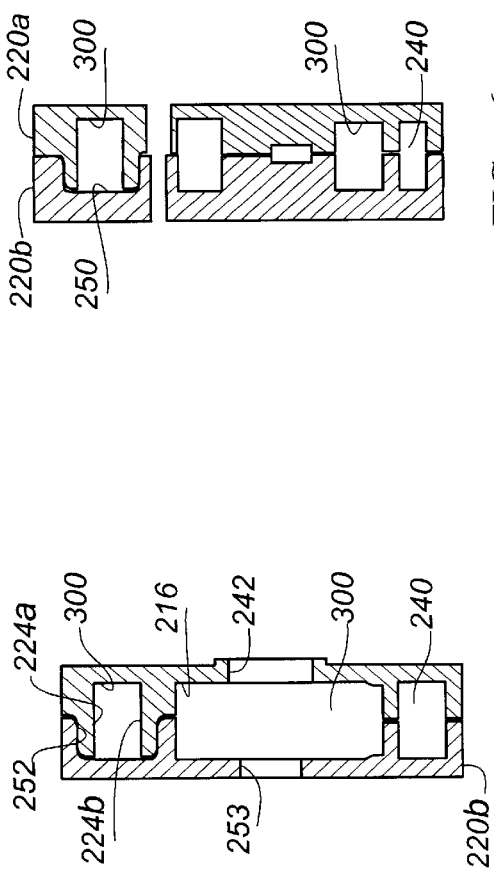
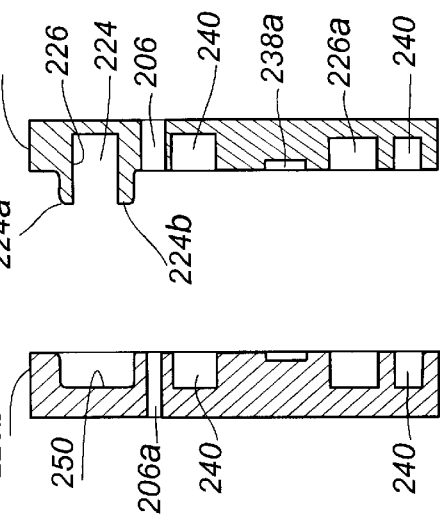
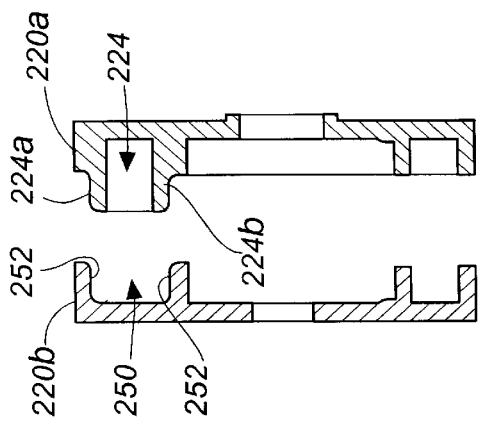

CHAIN LINK RACK PRETENSIONER

BACKGROUND AND SUMMARY OF THE INVENTION

The present invention generally relates to safety restraint devices for protecting vehicle occupants and more particularly to a pretensioning or belt tightening device used with a retractor and also an improved chain link rack used to rotate the retractor's spool.

Pretensioners or belt tighteners, as they are also called, operate in conjunction with seat belt retractors or are attached to one end of the belt that is connected to a seat belt buckle. The packaging of retractor pretensioners has created challenges for the suppliers of retractors and pretensioners as well as for the car designers and makers. Present pretensioners utilize a straight tube for harnessing the gas pressure from a pyrotechnic gas generator which acts on a piston which is propelled down the tube. The piston is connected to a Bowden cable, with its other end wrapped around a pulley or clutch. As the cable is pulled by the piston, the pulley rotates or the clutch is activated to reverse wind the web storage spool pretensioning (tightening) the seat belt about the occupant. The straight tube protrudes significantly away from the retractor and requires extra space to be packaged within the car's trim panels, or requires extra large holes at the mounting location for the seat belt retractor.

It is an object of the present invention to provide a simple, compact and reliable pretensioner that can be used with a seat belt retractor or where applicable a seat belt buckle.

The present invention provides a compact pretensioner that can be located on a side of the retractor and one that can be packaged within the side profile of the retractor This feature will allow the pretensioner and retractor to be packaged in a space only slightly larger than the space required for a standard retractor. The pretensioner is fitted with an electrically triggered pyrotechnic gas generator, which, when ignited in case of an accident, produces gas. The gas applies pressure on a piston that is connected to the back or rear end of a chain link rack (CLR) described below. As the gas pressure builds up, the piston pushes the chain link rack (CLR) across and rotates a gear. The gear is connected to the web storage spool of the retractor. As the gear and spool are forcibly rotated, the seat belt is retracted onto the spool and tightened about the occupant.

The chain link rack can be used in any application that otherwise would use a standard rack and pinion transmission. A benefit of using the chain link rack is that it can be packaged compactly in situations where the strength of a traditional rack is needed but where room is not available to satisfy the displacement needs of a traditional rack.

The CLR is comprised of a plurality of links formed by adjacent plates. In the preferred embodiment of the invention a wrench chain is used where the posts of the chain engage the teeth of the gear. The pretensioner uses a spacer or bridge plate disposed between spaced sets of teeth of the gear. The purpose of this plate is to extend a portion of the channel in which the chain travels. The plate functions to guide the chain and facilitate proper disengagement the chain from the gear teeth.

Accordingly the invention comprises: a pretensioner having: driven means, such as a spur gear with two parallel sprockets, operatively linked to a spool of a retractor to rotate the spool in a direction of belt retraction to cause a seat belt wound thereabout to retract The pretensioner includes an arcuate chamber having a flat exit end proximate the driven means; and a flexible drive means movable within a guide passage or tube, having a front end initially maintained out of engagement with the driven means and pushed into engagement with the driven means to cause same to rotate. The pretensioner further includes means for pushing the first drive means into engagement with the first driven means thereby causing the first driven means to rotate. Catch means, integral with the pretensioner and located within a housing thereof is provided to retain a portion of the drive means that has been pushed out of the exit end of the tube.

Many other objects and purposes of the invention will be clear from the following detailed description of the drawings.

BRIEF DESCRIPTION OF THE DRAWINGS

In the drawings:

FIGS. 5 and 6, show cross sectional views of the housing components

FIG. 7 shows a cross sectional view of the housing with pyrotechnic initiator.

FIGS. 8a, 8b, 9a, 9b, 10a, and 10b show cross sectional views of the housing components.

DETAILED DESCRIPTION OF THE DRAWINGS

Figure 1:
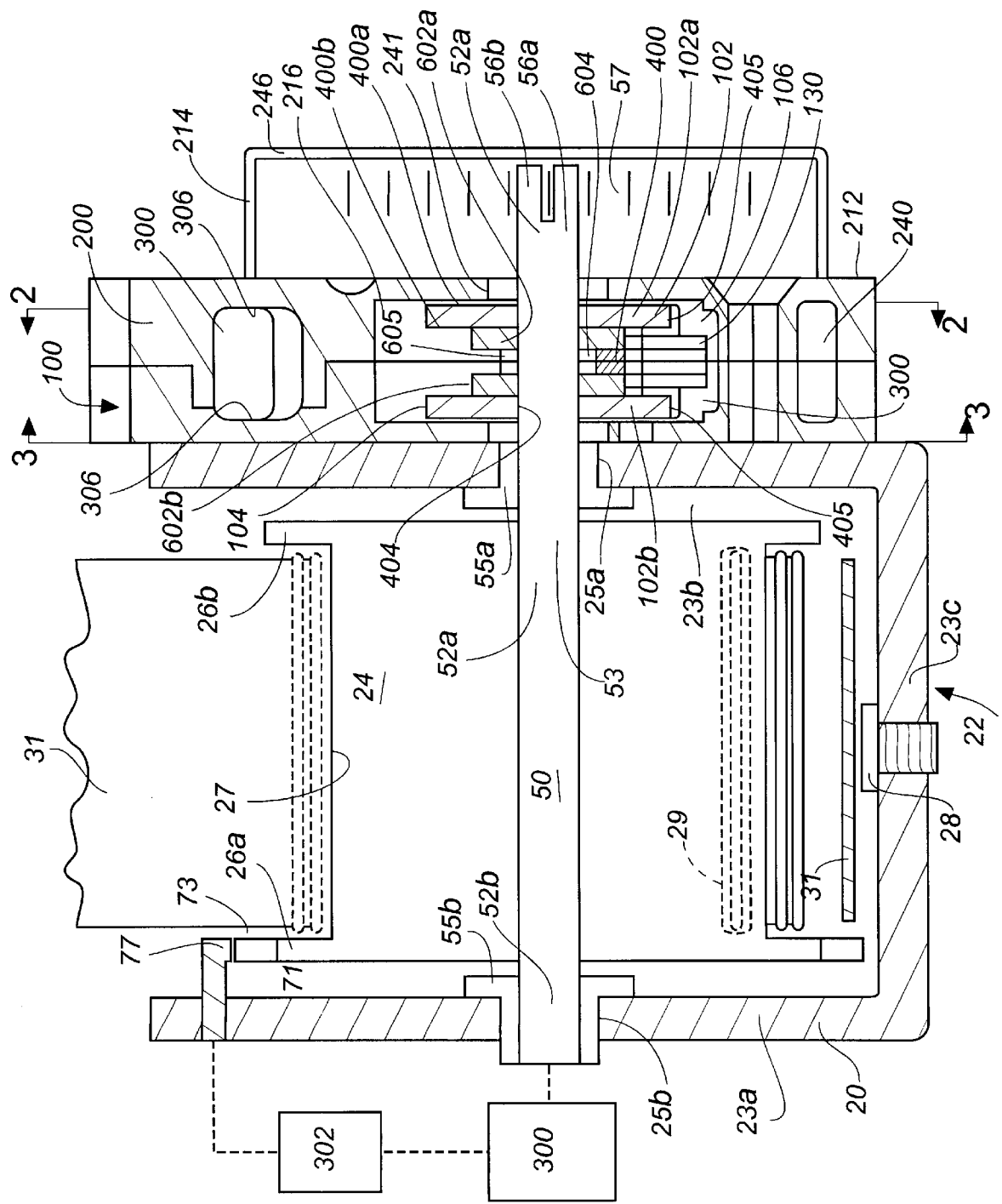
FIG. 1 illustrates a cross-sectional view of a seat belt retractor and pretensioner.

Reference is made to FIG. 1 which illustrates a typical retractor 20 operating in concert with a pretensioner 100. The retractor 20 comprises a U-shaped frame 22 adapted to be connected to a part of a vehicle body or to an occupant seat. The frame includes frame sides 23a,b having respective openings 25a and 25b and a rear or connecting part 23c typically having an opening for receipt of a fastening bolt 28. The retractor additionally includes a spool or reel 24 rotatably mounted to the frame 22. The spool has a center part or body 27 about which seat belt webbing 31 is wound (a few layers of webbing are shown in dotted line) and optional flanges 26a and 26b. The center part 27 includes a slot 29 into which the inner end of the seat belt 31 is inserted and held in a known manner. The spool includes a shaft assembly 50 having a right hand section 52a with a circular, wall profile 53 which is supported relative to bushing 55a. The section 52a includes a shaft extension 56a having a forked end 56b that forms a spring arbor and is adapted to receive a rewind spring 57, of known construction, to retract the extended seat belt. Integrally formed or seated on the shaft extension 56a is a gear 102 (also shown in FIG. 12), having two parallel sprockets 102a and 102b, each sprocket having an inner and outer side (400a,b). Each sprocket has disposed on the inner side respective annular ledges 602a,b that are connected by a center member post 604. An annular channel 605 is formed between the ledges, the bottom of the channel formed by the post 604. Each sprocket 102a and 102b additionally has an annular edge with an articulate pocket between teeth 405, a plurality of involute shaped teeth 104 (also shown in FIG. 12) and a center hole 404 that is keyed to receive the shaft. The gear 102 is part of the pretensioner 100. The left hand section 52b of the axle assembly is supported relative to the frame 22 by a bearing 55b.

The shaft or spool includes a lock mechanism which is diagrammatically illustrated having a lock wheel 71 that may be integrally formed thereon or pressed thereto having lock teeth 73 which are engaged by a rotatably mounted, locking pawl 77 in a known manner and includes a web sensor 300 and a vehicle sensor 302 which are diagrammatically illustrated. The lock wheel 71, is locked in response to information derived from the vehicle sensor and the web sensor. These sensors respectively sense an excessive rate of increase of seat belt protraction from the retractor 20 and excessive vehicle deceleration. As is known in the art the web sensor may be nestled within a lock cup (not shown) which is received adjacent a ratchet wheel. The vehicle sensor is carried by the lock cup and includes a sensor pawl that engages ratchet teeth. Movement of the lock cup moves the lock pawl 77 into engagement with the lock teeth 73. European Patent Document EP 0 228 729 A1 is illustrative of a retractor having a web sensor, vehicle sensor, and lock cup to move the lock pawl 77 into engagement with the lock wheel. This document is incorporated herein by reference.

The pretensioner 100 includes a housing 200 which may be a cast or machined metal (aluminum) housing. The housing 200 includes three major portions: a first housing section 210 (see FIGS. 3 and 4b), a second or center housing section 212 (see FIGS. 2 and 4a) and a third housing section 214 (see FIG. 1). As will be seen from the description below, the first and second housing sections 210 and 212 mate with each other defining a tube or passage 300 through which a chain 130 travels, a first internal cavity 216 to receive the sprocket gear 102 and a second, receiving or catch cavity 218 which receives the chain 130 after it is pushed through the tube 300. The third housing section 214 defines a spring cage (see FIG. 1) for protecting the return spring 57 and is attached to or formed as a part of the second housing section 212.

Figure 2:
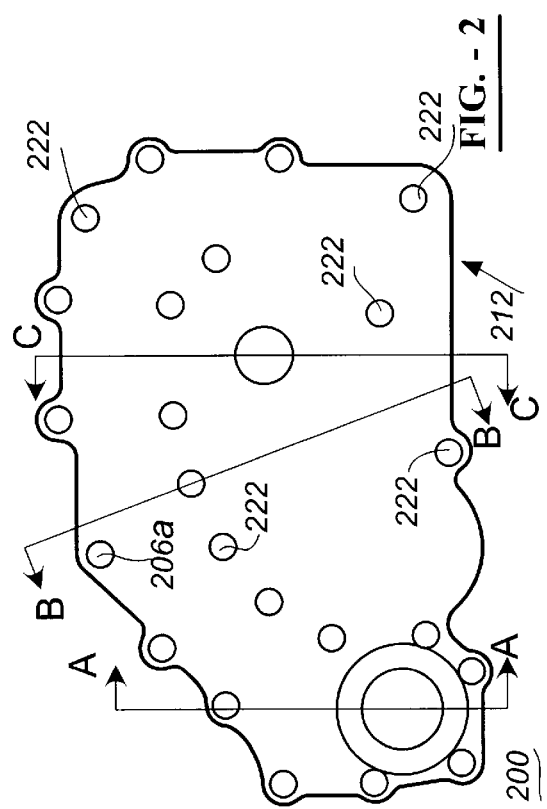
FIG. 2 is an isolated view of a housing section.
Figure 4B:
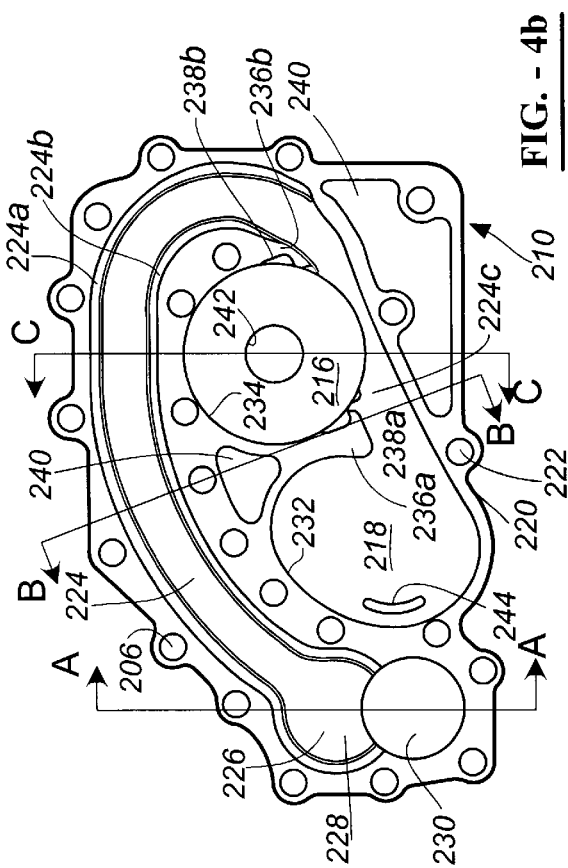
FIG. 4b is an isolated view of the interior of a housing section.
Figure 3:
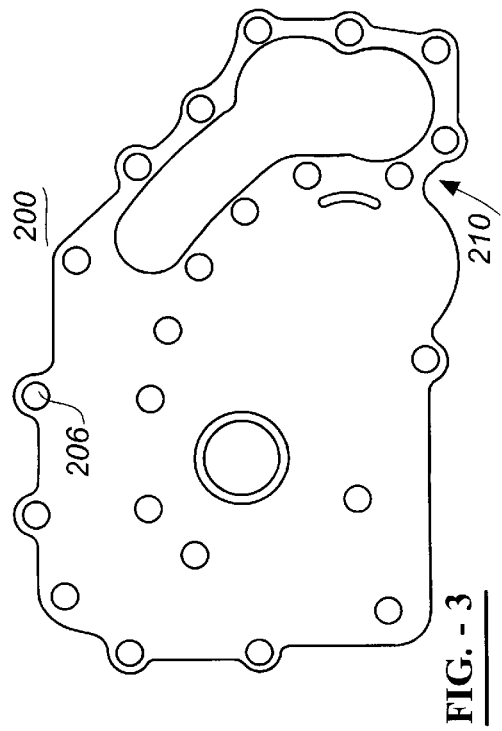
FIG. 3 is an isolated view of a housing section.
Figure 4A:
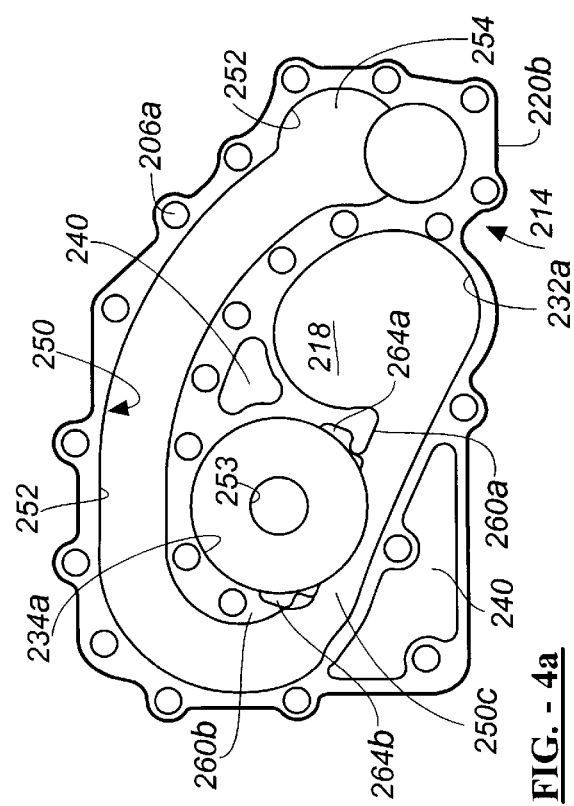
FIG. 4a is an isolated view of the interior of a housing section
Figure 14:
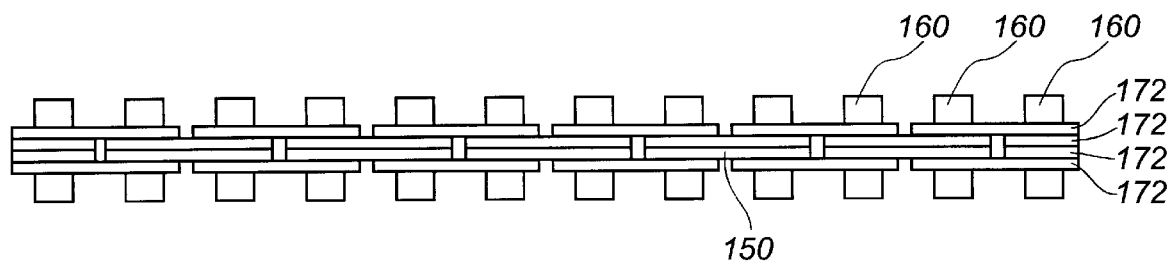
FIGS. 13 and 14 show a drive chain.
Figure 13:
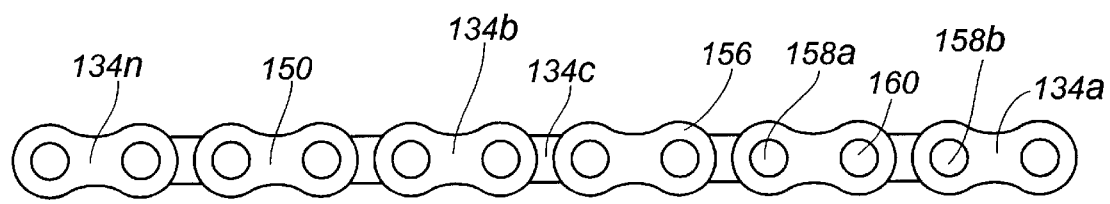

FIGS. 2 and 3 show exterior plan views of the housing sections 210 and 212. FIGS. 4a and 5b are plan views of each housing section showing their respective internal construction.

Housing section 210 includes a base plate 220a The base plate 220a includes a number of fastener openings 206 through which a like plurality of fasteners (not shown) are introduced into threaded holes 206a in housing section 212 to hold the first and second housing sections together. Each of the housing sections 210 and 212 further include additional mating openings 222 to receive a fastener used to attach the housing 200 to a frame side 23b.

Housing section 210 includes a channel 224 (see FIGS. 2, 5, 8b, 9b) which is formed by walls 224a and 224b which extend above the base plate 220a and a groove 226 which extends below the face of the base plate 220a as seen in FIGS. 5, 6, 8b and 9b. As will be seen this channel 224 forms part of the tube or passage 300. One end 226 of the channel (as walls 224a,b) transitions into two intersecting cylindrical walled portions 228 and 230. A pyrotechnic gas generator 120 is received within portion 230 and portion 228 acts as an gas expansion chamber. The base plate 220a of housing section 210 further includes two bores 232 and 234 which extend below the face of the base plate 220a. Bore 234 is slightly recessed below the bottom of bore 232. The groove 224 includes an extending portion 224c (see FIG. 4b) which joins the bores 232 and 234 and effectively forms an extension of the channel 224 and groove 226, this portion is generally flat to present the chain 130 properly to the gear 102. As can be seen in FIG. 4b, the bores 232 and 234 and the channel 224 form two extending portions or ledges 236a,b in the base plate 220a. Each ledge 236a,b includes a rectangular groove section 238a,b. A bridge plate 400 is seated within the grooves 238a,b and similar grooves 264a,b in the housing section 212. The base plate 220a also includes other bores generally shown as 240 which have no function other then weight reduction. The housing section 212 includes similar bores 240. Bore 234 includes a through bore 242 through which axle part 56a extends. Bore 232 includes a narrow slot 244 which acts as a pressure relief orifice to relieve the pressure internal to the housing 200.

As can be appreciated, the pressurized gases produced upon activation of the pyrotechnic device (initiator or squib) 120 will propagate down the tube (or passage 300). The mating housing section 212 is designed to reinforce the walls 224a,b of housing section 210. With reference to FIGS. 4a, 8a, 9a and 10a it can be seen that the housing section 212 also includes a base plate 220b. Plate 220b includes a groove 250 which extends below the face of the base plate 220b. The groove 250 is complementary to the shape of the walls 224a,b and slightly oversized such that the extending walls 224a,b are tightly received within the walls 252 of groove 250. The groove 250 at an end 254 is cylindrically shaped and also fits about the walled segments forming bores 228 and 230.

Figure 11A:
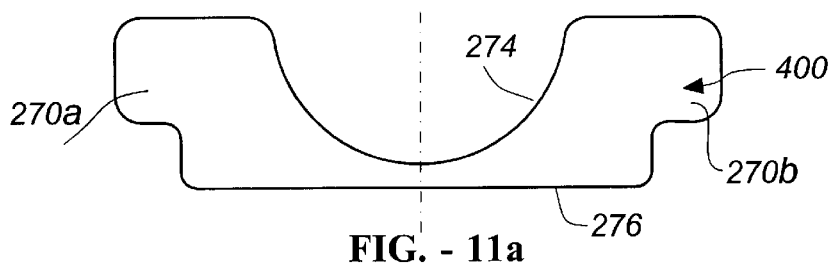
FIGS. 11a and 11b shows a bridge plate.
Figure 11B:
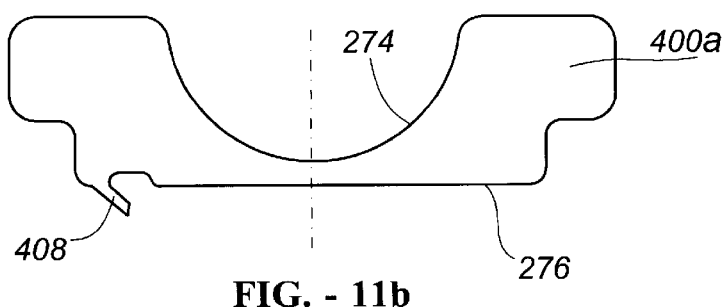
Figure 12:
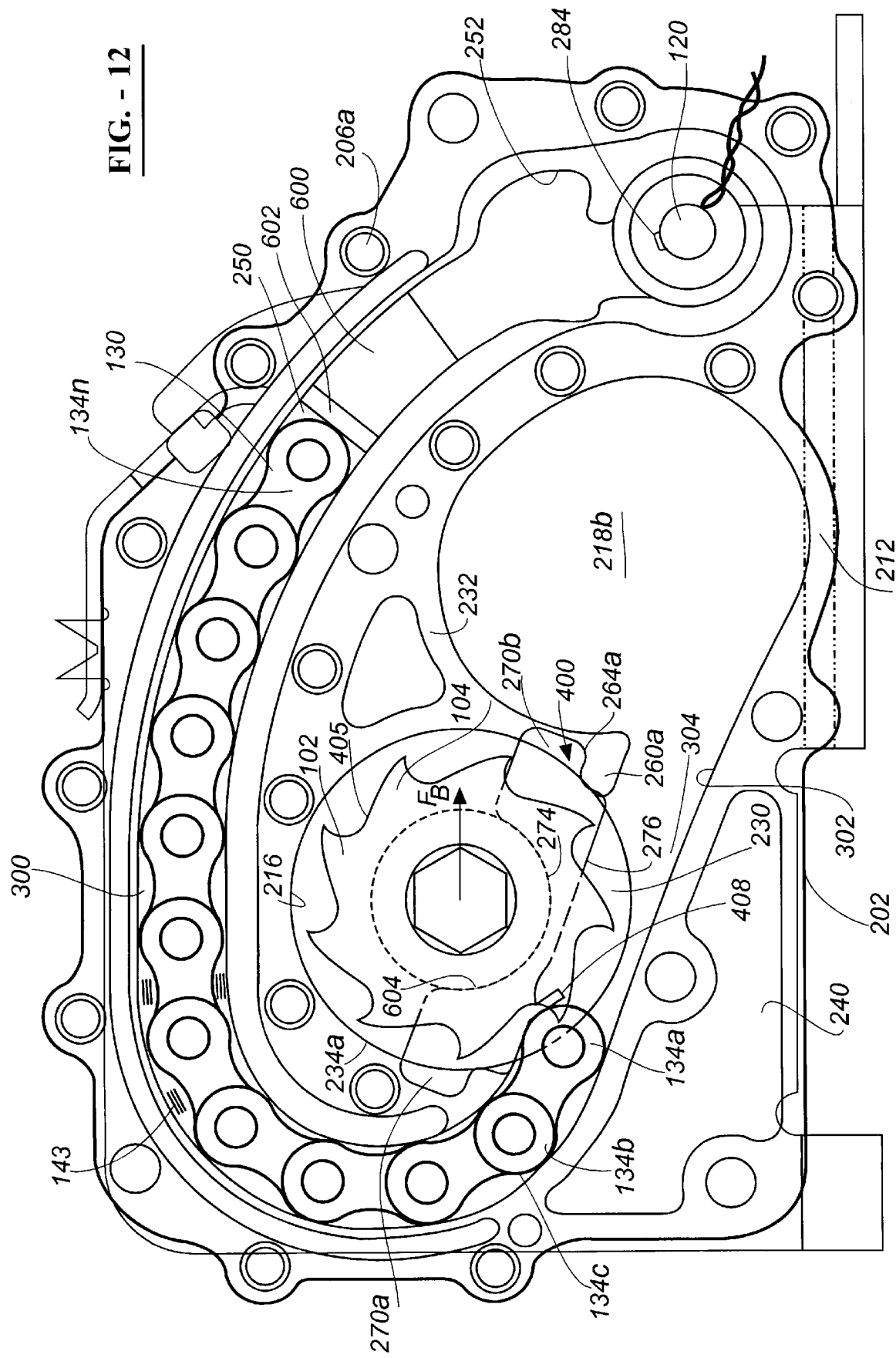
FIG. 12 is a cross-sectional view through section lines 2—2 of FIG. 1.

Base plate 220b also includes two complementary shaped bores 232a and 234a which defines ledges 260a and 260b in the base plate 220b. Each of these ledges includes rectangular indentations 264a and 264b. The base plate 212 also includes a portion 250c which extends the groove 250 across the bores 232a and 234a as well as a through bore 253 which on assembly is opposite bore 242 on the plate 220a. As can be appreciated when the housing section 210 and 212 are mated the bores 232 and 232a face each other to define the gear cavity 216, the bores 234 and 234a face each other to define the catch cavity 218, the grooves 224c and 250c are also in facing relating and the grooves or indentations 236a, 264a and 238s and 264b face each other and define pockets sufficient to trap ends 270a and 270b of the bridge plate 400 there between (see FIGS. 11a and 12). The bridge plate 400 is shown in FIG. 11a and includes a curved side 274 which is received about the center post 604 of the gear 102 and a flat side 276 which assists to define an extension of the tube 230 across the ledges 236a,b and 236a,b. Alternately, the bridge plate 400a has a flange 408 as shown in FIG. 11b, which extends into the channel as shown in FIG. 12 and is used to hold the CLR in its pre-event location.

Figure 15:
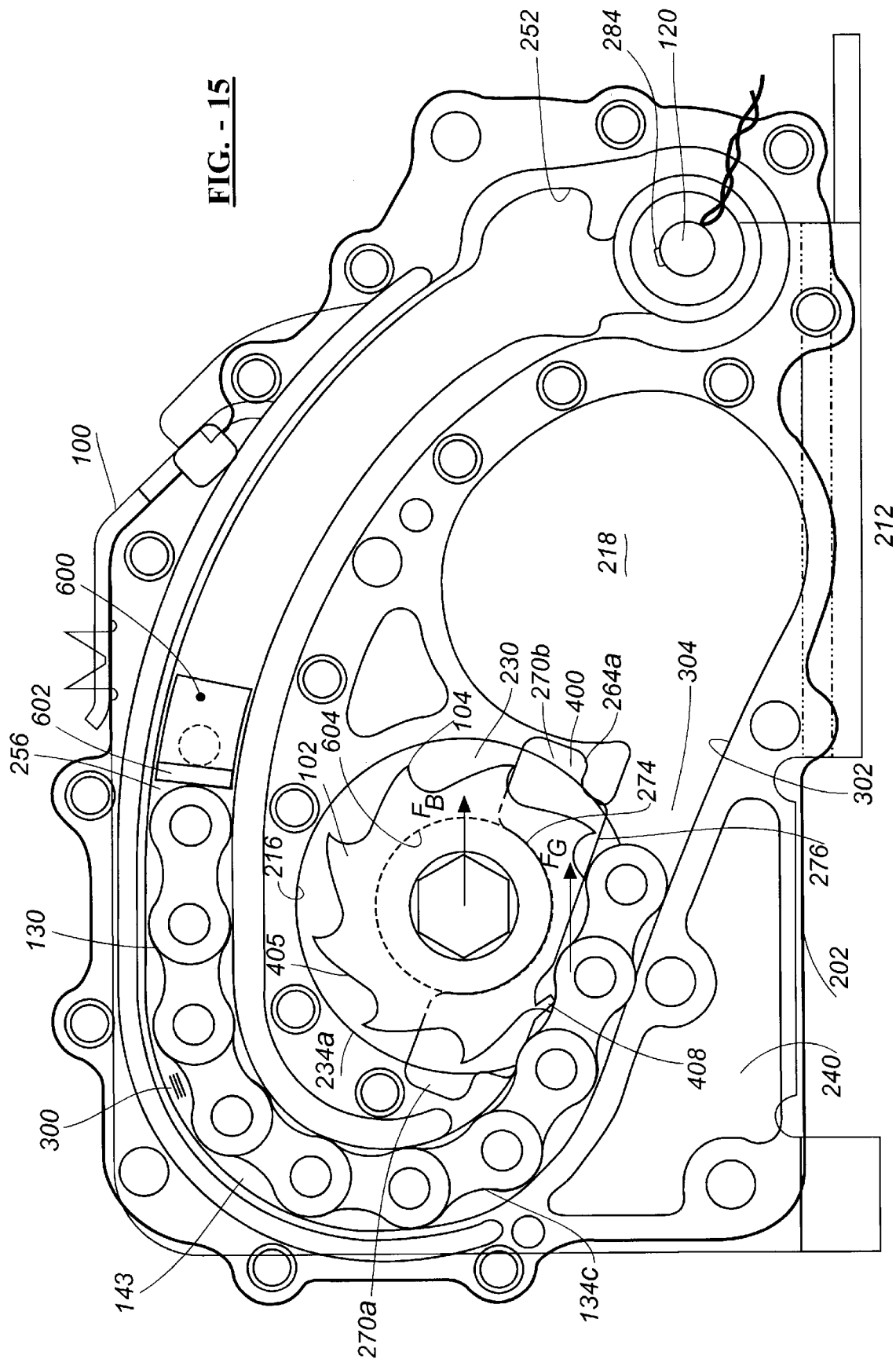
FIGS. 15 and 16 show various stages of operation of the invention.

Reference is briefly made to FIG. 15 which shows the pretensioner 100 in an active state with the piston 600 pushing the chain 130 which in turn drives the gear 102. As can be seen the force exerted by chain 130 in contact with the gear tooth 104 generates a generally horizontal force $F_G$. A similarly directed force $F_B$ is shared by bearings 55a,b urging them against the frame. This bearing force is counteracted by an oppositely direct force $F_B$ generated as the occupant loads the seat belt 31.

Figure 16:
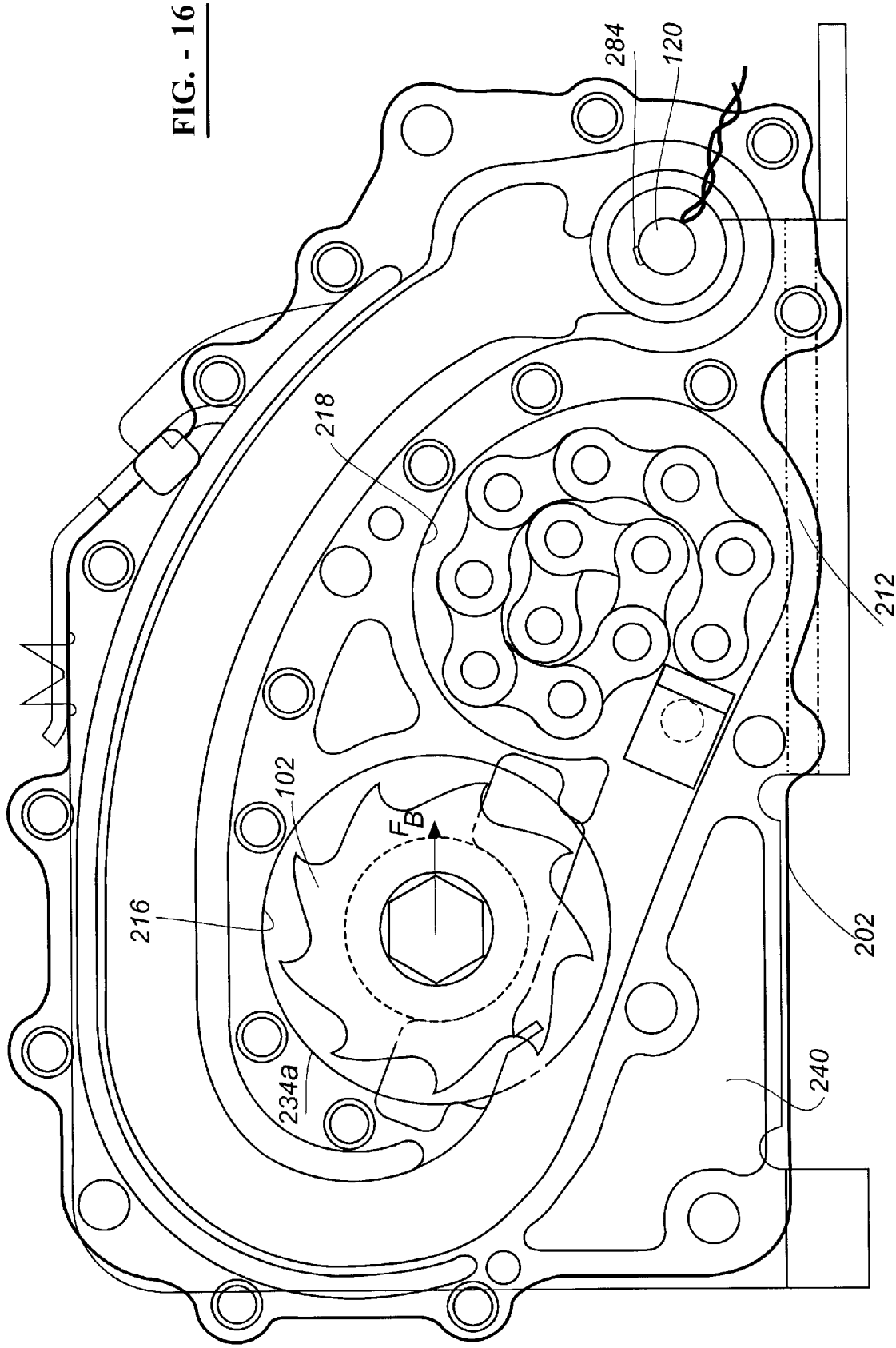

FIG. 16 shows the post emergency location of the chain 130. The chain 130 and piston 600 are located in the catch chamber 218.

Reference is briefly made to FIG. 7. Housing 212 further includes a bent tubular portion 276 defining a bore 278. As can be seen, when the two housing sections are mated a cavity 280 is formed to receive the pyrotechnic device 120. Further, upon joining the housing sections together, a pressure cavity 282 is formed. The pyrotechnic device 120 includes an exit port 284 to direct products of combustion directly into cavity 282.

Reference is now made to FIG. 12 which shows a chain link rack or chain 130 positioned within the open groove 250 prior to activation of the pyrotechnic device 120. While not shown, in this FIGURE, a portion of the chain 130 is also received in groove 224. As mentioned above grooves 224 and 250 define the tube or passage 300 (after the housing sections are mated together). The CLR 130 is a chain-like, flexible, toothed, force transfer member or a driving mechanism. The chain 130 includes a plurality of adjacent, joined links 134b and 134c. The first link is also generally designated as 134a and the last link is designated as 134n connected to the piston 600. Situated between the last link and the piston 600 is a metal plate 602 which may be molded within the piston 600. The piston 600 is elastomeric and serves to propel the chain 130 down the tube 300 and also provides a seal against the walls of the tube 300 to prevent the blow-by of gases. In the preferred embodiment the piston 600 is preferably made of an elastomeric material, having the properties: durometer range: 55–110; max tensile psi: 1800; intermittent temp max: 600 deg. F.; stiffening point temp:10 deg. F.; brittle point temp: −20 deg. F. The piston material must also show excellent flame resistance, not be extremely gas permeable, and resist weathering and oxidation. One such elastomer is Viton.

As mentioned, the pretensioner 100 includes the driven gear 102 with involute shaped teeth 104. The sides 105 of each gear tooth are generally curved to engage a post of the chain 130.

The teeth 104 of the sprockets 400a,b of gear 102 extend over the bridge plate 400 and into the passage 300 and are engaged by the chain 130. The plate 400 is disposed between ledge 602a and ledge 602b. The lower surface 302 of the tube 300 (formed by grooves 224 and 250) proximate end 304 is flat to permit the chain 130 to lay flat as it engages the gear teeth 104. Typically, the length of this flat portion is about two or three chain links. In a more general sense the engagement angle at which the CLR 130 engages the gear teeth 104 measured relative to the seat belt pull-off direction is chosen to minimize retractor bearing load during operation of the pretensioner. In the illustrated embodiment the pull-off direction of the seat belt is generally horizontal. If this engagement angle is equal to the pressure angle the bearing load will be minimized. A departure from this angle of +/−10° will provide adequate bearing protection.

To reduce or eliminate any noise due to the rattling of the CLR 130 within the tube 300, as well as lubricating the tube and gear 102, the tube can be filled, from for example piston 142 to the first link 134a, with a temperature stable grease or paraffin, both generally referred to as 143, that remains in a non-crystalline state at low temperatures such as −40° C. and in a non-fluid state at a high temperatures of about 100° C.

As can be seen from FIG. 12 the first link 134a of the CLR 130 is initially maintained apart from the drive gear 102 so as not to impede the gear. (which rotates with the spool) normal retraction and protraction of the spool. As mentioned, the last link 134n is adjacent to the piston 600. This piston provides a front side and the squib 120 provides the rear side of the chamber 282. The piston 600 is generally shaped as a rectangular plug tightly fitted within the tube 300. A rear end of the piston 600 flares outwardly under pressure to provide a gas seal against the sides of the tube 300.

The operation of the system comprising the retractor 20 and pretensioner 100 is as follows. Upon sensing an emergency condition the initiator (squib) 120 is activated to produce products of combustion which bear against a facing wall of the piston 600. The seal of the piston prevents the products of combustion from escaping from the chamber 282. Thereafter the piston 600 is propelled down the tube 300 and in so doing pushes the chain 130 down the tube 300. Each link of the CLR is guided by the tube guide walls 224a,b. As each link 134a–134n moves past the driven gear 102, the gear teeth 104 are engaged by a chain pin 160. As the driven gear 102 is driven by the chain pins of the chain 130, the spool 24 is reverse rotated to retract a determinable amount of webbing back onto the spool drawing the seat belt 31 tight about the occupant. Under the operation of the pretensioner 100 and assuming a full CLR 130 stroke, the spool 24 will reverse rotate about 2.0 to 2.5 revolutions.

As the CLR 130 advances through the tube 300 its first link is pushed through the open, flat end 302. As previously mentioned, in the vicinity of the gear 102 the tube is flat to insure that at least two (2) gear teeth 104 are in engagement with CLR pins 160. As the piston 600 continues to move through the tube 300 the chain 130 is pushed a greater distance out of the tube to engage the bridge plate 400. The chain 300 breaks or bends tab 408 (if used) and slides between the plate and the exterior wall 252 of the tube 300 and rolls up with the catch cavity 218 as shown in FIG. 15. The angled orientation of the bridge plate 400 causes the first link 134a to engage one of the moving links with a forward component of momentum.

During the operation of the pretensioner the vehicle sensor 302 or web sensor 300 has similarly been activated by the accident moving the locking pawl 77 into locking engagement with the teeth of the locking wheel 71. During pretensioner operation the spool and locking wheel pawl are reverse wound and the locking ratchets over the typically curved lock wheel teeth 73. After belt slack has been eliminated under the action of the pretensioner 100 and when the belt is later loaded by the occupant, the belt 31 is prevented from protracting by the locking engagement of the pawl 77 with the teeth 73 of the lock wheel 71.

Reference is briefly made to FIG. 1 which show the third housing section or spring cage. This third housing section 214 is used to protect the retraction spring 57 for the retractor as known in the prior art.

Many changes and modifications in the above described embodiment of the invention can, of course, be carried out without departing from the scope thereof. Accordingly, that scope is intended to be limited only by the scope of the appended claims.

We claim:
1. An apparatus (20, 100) comprising:
   driven means (102) comprising a length of joined links (134) operatively linked to a spool of a retractor (20) to rotate the spool (24) in a direction of retraction to cause a seat belt (31) wound thereabout to retract to eliminate belt slack about an occupant;
   an arcuate tube (300);
   drive means (130), movable within the tube, having a front end (134a) initially maintained out of engagement with the driven means and pushed into engagement with the driven means to cause same to rotate;
   first means (120) for pushing the drive means into engagement with the driven means thereby causing the driven means to rotate; and catch means for retaining all of the drive means after it has exited the exit end of the tube.

2. The apparatus as defined in claim 1 wherein the first means comprises a gear wheel having two sprockets and a plurality of gear teeth which are engaged by and driven by pins formed on the chain links.

3. The apparatus as defined in claim 2 wherein a guide plate is disposed between the sprockets of the gear.

4. An apparatus (20, 100) comprising:

driven means (102) operatively linked to a spool of a retractor (20) to rotate the spool (24) in a direction of retraction to cause a seat belt (31) wound thereabout to retract to eliminate belt slack about an occupant;

an arcuate passage (300);

drive means (130), moveable within the passage, having a front end (134a) pushed into engagement with the driven means to cause the same to rotate;

first means (120) for pushing the drive means into engagement with the driven means thereby causing the driven means to rotate; and wherein the driven means includes a gear wheel having two sprockets (400a,b), each sprocket having a plurality of gear teeth (104) which are engaged by and driven the drive means.

5. The apparatus as defined in claim 4 including catch means retains at least a portion of the drive means after it has exited an exit end of the passage.

6. The apparatus as defined in claim 1 wherein the catch means is of sufficient size to retain the entire drive means after it has exited the exit end of the passage.

7. The apparatus as defined in claim 4 wherein the drive means is a flexible drive means of integral construction.

8. The apparatus as defined in claim 7 wherein the flexible drive means includes a plurality of sets of joined links.

9. The apparatus as defined in claim 4 wherein the passage (300) is integrally formed as part of a housing (200) which protectively encloses the drive means and driven means.

10. The apparatus as defined in claim 9 wherein the housing (200) is formed from first (210) and second (212) mating sections.

11. The apparatus as defined in claim 4 further including a retractor frame (22) for rotationally supporting the spool (24) and a return spring (57) for retracting the seat belt;

at least one sensor (300, 302) for initiating the locking-up of the spool.

12. The apparatus as defined in claim 4 wherein the first means comprises a pyrotechnic device (120) which generates products of combustion to propel a piston (600) down the passage.

13. The apparatus as defined in claim 12 wherein the piston (600) is formed by an elastomeric material and is self sealing to the passage (108).

14. The apparatus as defined in claim 4 wherein a guide plate (400) is disposed between the sprockets (102a,b) of the gear (102).

15. The apparatus as defined in claim 4 wherein the drive means is a flexible chain having by a plurality of pins (160) and chain links, wherein the gear teeth are driven by the pins.

16. The apparatus as defined in claim 15 wherein an exit end of the tube is sufficiently flat to present the flexible drive means in a flat orientation prior to engagement with gear teeth formed on the driven means.

17. A pretensioner comprising:

driven means having two parallel sprockets, operatively linked to a spool of a retractor to rotate the spool in a direction of belt retraction to cause a seat belt wound thereabout to retract;

an arcuate chamber forming a guide passage having a flat exit end proximate the driven means; and a flexible drive means movable within the guide passage, having a front end initially maintained out of engagement with the sprockets of the driven means and pushed into engagement with the driven means to cause same to rotate;

means for pushing the flexible drive means into engagement with the driven means thereby causing the driven means to rotate;

catch means, formed as an integral part of a housing to retain at least a portion of the flexible drive means after the flexible drive means has been pushed out of the exit end of the guide passage.

* * * * *